US009447985B2

(12) United States Patent
Johnson, Jr.

(10) Patent No.: US 9,447,985 B2
(45) Date of Patent: Sep. 20, 2016

(54) HVAC CONTROL SYSTEM AND METHODS FOR OPERATING SAME

(71) Applicant: Johnson Solid State, LLC, Washington, MI (US)

(72) Inventor: David Johnson, Jr., Washington, MI (US)

(73) Assignee: JOHNSON SOLID STATE, LLC, Washington, MI (US)

( * ) Notice: Subject to any disclaimer, the term of this patent is extended or adjusted under 35 U.S.C. 154(b) by 0 days.

(21) Appl. No.: 14/830,807

(22) Filed: Aug. 20, 2015

(65) Prior Publication Data

US 2016/0061473 A1   Mar. 3, 2016

Related U.S. Application Data

(60) Provisional application No. 62/041,701, filed on Aug. 26, 2014.

(51) Int. Cl.
  *F24F 11/00*   (2006.01)
  *G05B 15/02*   (2006.01)

(52) U.S. Cl.
  CPC .......... *F24F 11/006* (2013.01); *G05B 15/02* (2013.01); *F24F 2011/0013* (2013.01); *F24F 2011/0016* (2013.01); *F24F 2011/0046* (2013.01); *F24F 2011/0047* (2013.01); *F24F 2011/0057* (2013.01); *F24F 2011/0068* (2013.01); *F24F 2011/0075* (2013.01); *G05B 2219/2614* (2013.01); *G05B 2219/2638* (2013.01); *Y02B 30/542* (2013.01); *Y02B 70/3275* (2013.01)

(58) Field of Classification Search
  None
  See application file for complete search history.

(56) References Cited

U.S. PATENT DOCUMENTS

| 8,180,493 B1 * | 5/2012 | Laskow .............. F24F 11/0086 165/201 |
| 2004/0253918 A1 | 12/2004 | Ezell et al. |
| 2005/0156052 A1 | 7/2005 | Bartlett et al. |
| 2006/0207272 A1 | 9/2006 | Hirayama et al. |
| 2012/0006525 A1 * | 1/2012 | Lafleur ................. F24F 11/006 165/238 |
| 2012/0145802 A1 | 6/2012 | Peterson et al. |
| 2013/0255297 A1 | 10/2013 | Matsuoka et al. |

OTHER PUBLICATIONS

International Search Report and Written Opinion—PCT/US15/46185.

* cited by examiner

*Primary Examiner* — Sean Shechtman
(74) *Attorney, Agent, or Firm* — Mitchell Law PLLC; Matthew W. Mitchell

(57) ABSTRACT

A system and method for operating an HVAC system having a cooling system and ventilation system to vent outside air within a structure is disclosed. The method includes monitoring an interior temperature of the structure, monitoring an exterior temperature of ambient air outside of the structure, defining a first time range and a second time range, associating one or more operating parameters of the HVAC system with the first time range, associating one or more operating parameters of the HVAC system with the second time range, monitoring operational time and operational load of the cooling system for the first time range, and controlling the ventilation system during the second time range based upon the monitored operational time and operational load of the cooling system in the first time range, and the monitored interior and exterior temperatures.

25 Claims, 7 Drawing Sheets

HVAC CONTROL SYSTEM AND METHODS FOR OPERATING SAME

CROSS-REFERENCE TO RELATED APPLICATION(S)

This application claims the benefit of U.S. Provisional Application Ser. No. 62/041,701, filed Aug. 26, 2014, which is hereby incorporated herein by reference in its entirety.

TECHNICAL FIELD

This disclosure relates to temperature control of buildings and other structures, and more particularly to systems and methods for utilizing exterior ambient air for cooling and ventilating buildings and other structures.

BACKGROUND

The statements in this section merely provide background information related to the present disclosure and may not constitute prior art.

Heating, ventilation, and air conditioning (HVAC) systems of structures, are operable to condition the interior air of the structure, i.e., to selectively heat and cool the interior air of the structure. The HVAC system includes mechanical systems for heating and cooling air that is delivered into the interior of the structure via ductwork, to selectively heat or cool the interior air.

Many HVAC systems have electronically controlled exterior air dampers, which are capable (when used in conjunction with the blower of the HVAC system) of circulating "fresh" exterior air into the structure. In addition to HVAC systems having mechanical means (cooling systems, often utilizing compressor(s), condenser fans, blower motors, etc.) to condition the space of the structure, many HVAC systems have the means to utilize cool exterior air to condition the space, via an exterior air damper (also referred to as an "economizer").

Many structures have electronically controlled exhaust systems, which are capable of exhausting air from the structure. Often, a structure's exhaust system(s) draws air from near the roof of the structure, and exhausts that air to the outside of the structure.

The operation of the mechanical systems, e.g., cooling systems, consumes energy, adds wear and tear to the equipment, and increases the failure rate of that equipment, which may be financially costly. As such, it is desirable to condition the interior air of the structure to desired temperatures by utilizing suitable exterior air, thereby increasing energy efficiency and reducing cost and system wear, and making accommodations for certain governing authorities' minimum requirements concerning indoor air quality.

SUMMARY

A system and method for operating an HVAC system having a cooling system and ventilation system to vent outside air within a structure is disclosed. The method includes monitoring an interior temperature of the structure, monitoring an exterior temperature of ambient air outside of the structure, defining a first time range and a second time range, associating one or more operating parameters of the HVAC system with the first time range, associating one or more operating parameters of the HVAC system with the second time range, monitoring operational time and operational load of the cooling system for the first time range, and controlling the ventilation system during the second time range based upon the monitored operational time and operational load of the cooling system in the first time range, and the monitored interior and exterior temperatures.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
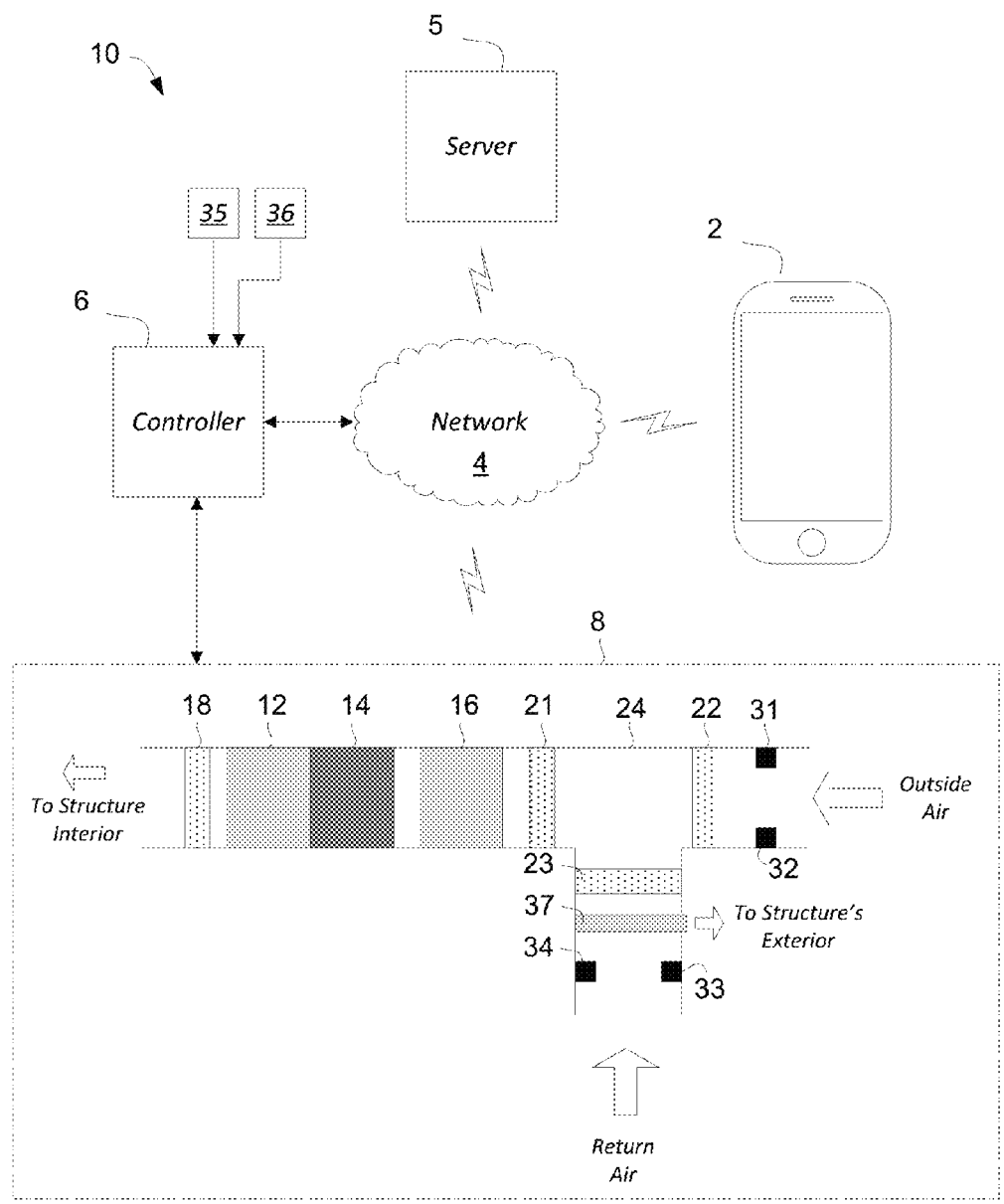
FIG. 1 schematically shows an exemplary HVAC system, in accordance with the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based upon" is not exclusive and allows for being based upon additional factors not described, unless the context clearly dictates otherwise. The word "exemplary" is used herein to mean "serving as an example, instance, or illustration." Any embodiment described herein as "exemplary" is not necessarily to be construed as preferred or advantageous over other embodiments. As used herein the terms building and structure may be used interchangeably. Upon a careful reading of the teachings herein, one skilled in the art may readily apply the teachings to any number of building and structure types falling within the spirit of this disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows an exemplary HVAC system 10 that may help implement the methodologies of the present disclosure. The system 10 may include various HVAC equipment components 8 configured to condition the interior air of the structure, i.e., to selectively heat and cool the interior air of the structure. The system 10 includes a controller 6 for controlling the HVAC equipment components 8. In various embodiments, the system 10 may include a server 5, a network 4 and/or a mobile device 2. The methods and devices of the present disclosure may be practiced with the HVAC system 10 and/or as part of HVAC system 10.

The server 5 may be directly communicatively connected to the controller 6 and the mobile device 2 or communicatively connected via the network 4. The server 5 may be: various embodiments of a computer including high-speed microcomputers, minicomputers, mainframes, and/or data storage devices. The server 5 preferably executes database functions including storing and maintaining a database and processes requests from the controller 6 and/or mobile device 2 to extract data from, or update, a database as described herein below. The server 5 may additionally provide processing functions for the mobile device 2 and the controller 6 as will become apparent to those skilled in the art upon a careful reading of the teachings herein.

As shown in FIG. 1, the HVAC controller 6 may be directly communicatively connected to one or more of the HVAC equipment components 8 including one or more sensors 31, 32, 33, and/or 34. In one embodiment, the controller 6 is wirelessly connected to the one or more HVAC equipment components 8 via the network 4. In embodiments utilizing a mobile device 2, the mobile device 2 may be physically or wirelessly connected to the network 4 and/or the controller 6 during selected periods of operation without departing from the teachings herein. Components of the system 10 are shown in FIG. 1 as single elements. Such illustration is for ease of description and it should be recognized that the system 10 may include multiple additional components in various embodiments without departing from the teachings herein. For example, in various embodiments the controller 6 may be incorporated into the server 5.

The exemplary HVAC system 10 shown in FIG. 1 includes an HVAC controller 6, which may be or may include a thermostat or a hydronic heat transfer system control in some embodiments. The HVAC controller 6 may be configured to communicatively interact with and control various components of the HVAC components 8. As shown in FIG. 1, the HVAC controller 6 may be directly connected to the HVAC components 8 or connected via a network 4 which may be a locally based network or a wider network such as the Internet. In various embodiments, the mobile device 2 is communicatively connected to the controller 6 so that a user may control the HVAC components 8 using the mobile device 2 via the controller 6.

The HVAC components 8 may include a heating system 12, a cooling system 14, a ventilation system 16 including a fan, i.e., a blower, a humidification system 18 and/or any other HVAC components or systems, as desired such as an outside air damper 22 or intake damper 23. In various embodiments, HVAC components include auxiliary heating and cooling equipment. Exhaust fans 37 and supply air fans 16, removing air from the structure, and moving air into the structure, respectively, may also be used in various embodiments. The HVAC components 8 primarily function as a forced air system although auxiliary HVAC components may be used in conjunction to supplement conditioning of the environment within the building. For example, auxiliary heat may be provided by electrical resistive heaters, hot water radiant heat, boilers, and/or electric base board heaters in various embodiments.

As illustrated in exemplary FIG. 1, the heating system 12 and the cooling system 14 are combined in a forced air system; however it is contemplated herein that the heating and cooling systems 12 and 14 may be separated. For example in residential and/or light commercial applications, in various embodiments, a heat pump system may be utilized separate from an air conditioning cooling system 14.

In various embodiments the HVAC components 8 include any number of intake and outtake dampers. In the illustrated embodiment a filter 21, a first damper 22, and a second damper 23 are utilized consistent with the teachings herein. The damper 22 may be in communication with outside air and the fan 16 is in communication with one or more of the dampers 22 and 23 within a ducting 24, for example. The dampers 22 and 23 may be selectively actuatable as a group or individually in various embodiments.

The HVAC components 8 may include cooling equipment, which may include more than one unit and/or more than one stage of cooling. The HVAC components 8 are selectively in gaseous communication with exterior ambient air and including operability to intake and/or vent exterior ambient air. In various embodiments the ventilation equipment may provide different levels of air movement as described herein below. The HVAC components 8 may include other units such as a humidifier unit, a dehumidifier unit, a UV filter unit and/or any other suitable HVAC unit and/or equipment as desired.

The HVAC components 8 may include one or more sensors, such as an exterior ambient air temperature sensor 31, an exterior humidity sensor 32, a return temperature sensor 33, and/or a smoke detector 34. The sensors 31, 32, 33, and 34 may be directly or indirectly communicatively connected to the controller 6. The exterior ambient temperature sensor 31 is configured to measure a temperature of the outside air and, for example, may be mounted to an exterior of the building, or factory installed as part of the HVAC components 8. The exterior humidity sensor 32 may also be mounted external to ducting of the HVAC components 8 or factory installed as part of the HVAC components 8. An interior temperature sensor 35 measures a temperature of the interior air of the building. The sensor 35 may be internal to the controller 6 or external. Optionally, an interior humidity sensor 36 measures the humidity of the interior air of the structure. The sensor 36 may be internal to the controller 6 or external. In one embodiment, the controller 6 may obtain outside, i.e., exterior air temperature and/or humidity conditions through an online weather service or may be in communication with a building automation system having equivalent measuring functionality. In one embodiment, predicted weather conditions may be utilized by the controller 6. In various embodiments, the interior and exterior humidity sensors 36 and 32 are optional. In various embodiments, sensors 33 and 34 are optional.

The network 4 may be any suitable series of points or nodes interconnected by communication paths. The network 4 may be interconnected with other networks and contain sub network(s) such as, for example, a publicly accessible distributed network like the Internet or other telecommunications networks (e.g., intranets, virtual nets, overlay networks and the like). The network 4 may facilitate the exchange of data between and among the HVAC components 8, the HVAC controller 6, and the sensors 31, 32, 33, 34, 35 and 36; although in various embodiments the HVAC controller 6 may be directly connected to the HVAC components 8 and/or the sensors 31, 32, 33, 34, 35 and 36.

In various embodiments, the mobile device 2 may include one or more applications that the user may operate. Operation may include downloading, installing, turning on, unlocking, activating, or otherwise using the application in conjunction with the controller 6. The application may comprise at least one of an algorithm, software, computer code, executable instruction sets and/or the like, for example, mobile application software. In the alternative, the application may be utilized remotely through a website accessible through the world wide web.

Figure 2:
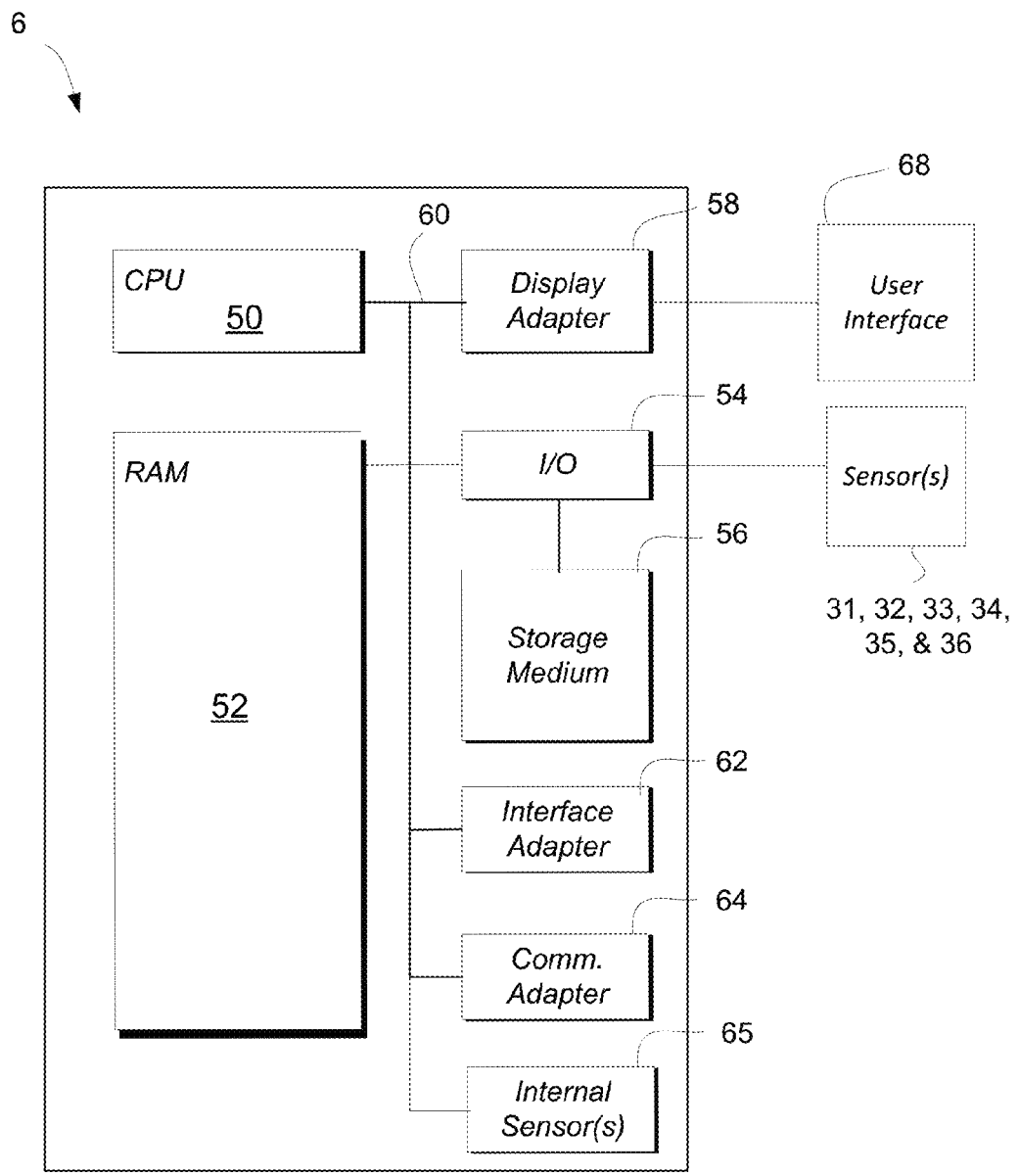
FIG. 2 schematically shows an exemplary HVAC controller, in accordance with the present disclosure.

FIG. 2 shows the exemplary HVAC controller 6. The controller 6 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as various dials buttons and/or keypads, to the system bus 60, and a communication adapter 64 for connecting the controller 6 to the network 4. The memory 52 and storage medium 56 may be used to store any appropriate information such as HVAC control routines or code, historical performance data, HVAC system and/or HVAC controller parameters, one or more programmable schedules for changing HVAC system parameters over time, etc.

The central processing unit 50 is preferably one or more general-purpose microprocessor or central processing unit(s) and has a set of control algorithms, comprising resident program instructions and calibrations stored in the memory 52 and executed to provide the desired functions. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

The HVAC controller 6 may include any number of suitable components related to effecting control of the HVAC system 10. For example, HVAC controller 6 may include a user interface 68 which may be graphical. The user interface 68 may include one or more displays, switches, and/or buttons that a user may actuate or otherwise control. In one embodiment, a touchscreen display may be provided to display the user interface 68 and provide interaction therewith.

In one embodiment, one or more of a cooling device, heating equipment and/or ventilation equipment may be distinct systems controlled, either directly or indirectly, by the HVAC controller 6. In some embodiments, it is contemplated that the HVAC controller 6 may separately control each component 8. HVAC system parameters may include set points for heating, cooling, humidity, etc., modes for ventilation equipment, fan settings, and the like and as further described below.

The HVAC controller 6 may include one or more internal sensors 65, such as a temperature sensor and/or a humidity sensor. The internal sensors 65 may be in addition to the sensors 35 and 36 and may be used for supplemental or redundancy purposes, as exemplary. The HVAC controller 6 may include one or more outputs configured to issue operation commands to the HVAC components 8. It is contemplated herein that the HVAC controller 6 may be configured to execute any method of the present disclosure. The HVAC controller 6 may be communicatively connected to one or more sensors connected external to a building structure and external to a housing of the controller 6. The connection may be via wire or via a wireless embodiment of the network 4.

In various embodiments, the HVAC controller 6 may maintain in its memory an operating schedule that may be used to control the HVAC system based upon time and/or day. The schedule may, for example, be a daily programmable schedule or any other schedule. In some cases, the schedule may have a number of days and one or more time periods for each of at least some of the days. In some instances, the nominal schedule may include an "occupied", an "unoccupied", and a "stand-by" time period for each of the days of a week. The schedule may have at least one set point associated with each of the one or more time periods. The schedule may be maintained in the memory 52, and may be modified by an end user in various embodiments.

Figure 3:
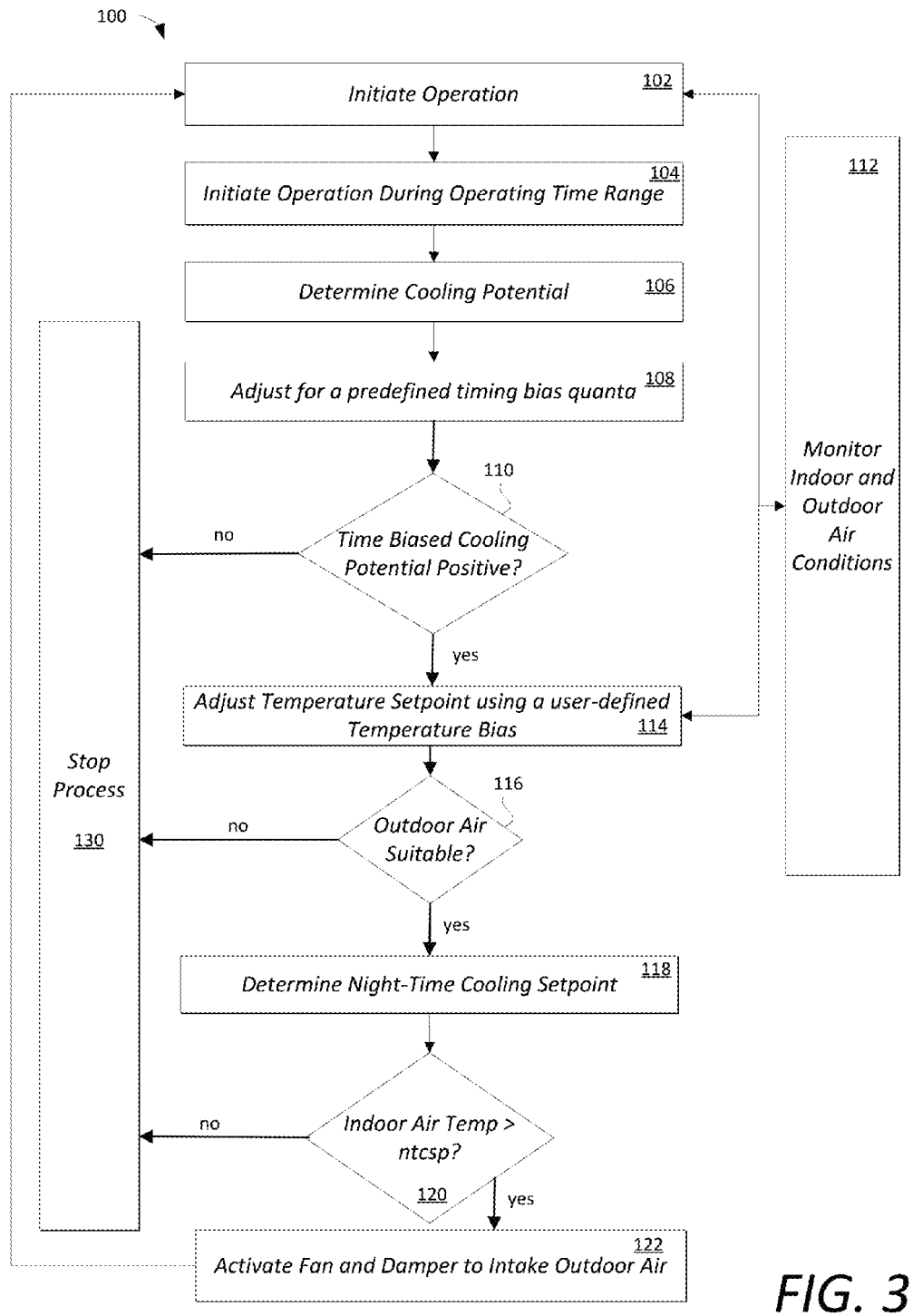
FIG. 3 is a control scheme for operating the exemplary HVAC system, in accordance with the present disclosure.

FIG. 3 shows a control scheme 100 for operating the controller 6 and the HVAC components 8. Although the control scheme 100 is shown as discrete elements, such an illustration is for ease of description and it should be recognized that the functions performed by the control scheme 100 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

Figure 7:
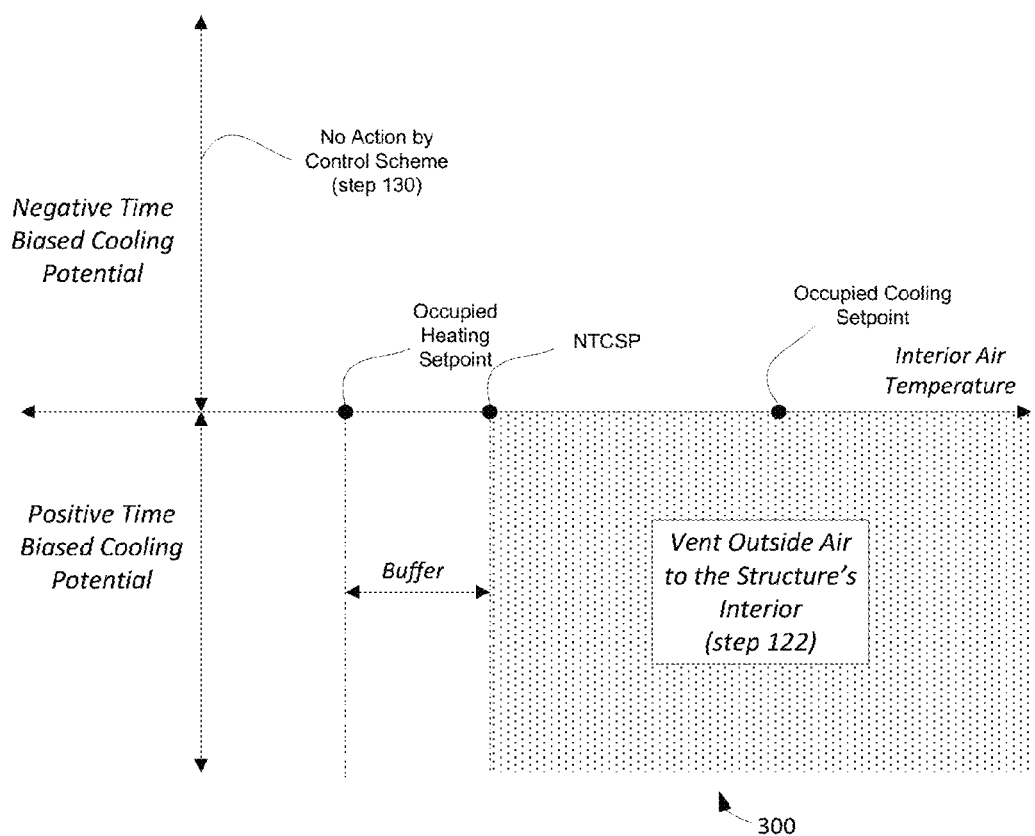
FIG. 7 graphically shows operation of the HVAC system for venting outside air into a structure with respect to indoor temperature, in accordance with the present disclosure.

The control scheme 100 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 100 is configured, in one exemplary implementation, to operate one or more of the HVAC components 8 using the controller 6 to condition the interior environment. As FIG. 3 shows, the control scheme 100 is initiated at step 102 whereby the controller 6 operates the HVAC components 8 based upon a user's predefined or default operating parameters, and the results of a prior iteration of the control scheme 100. In the exemplary case of cooling the interior air of a building, the control scheme 100 operates during cool mornings to proactively ventilate the building with cool exterior air based upon the operation of the HVAC components 8 during a previous period, e.g., during the previous day.

In one embodiment, the HVAC components 8 may transition between an occupied state and an unoccupied state. In one embodiment, the control scheme 100 is operated only at a predetermined time range. While operating in an occupied state, the controller 6 typically operates to maintain interior air conditions at desired levels, for example, levels directed at maintaining comfortable conditions for occupants, e.g., a user-supplied set point. In one embodiment, while in the predetermined time range, the controller 6 executes the control scheme 100 to maintain interior air conditions at a second set of preferential conditions, which may be directed at a different set of objectives, e.g., energy conservation, equipment wear reduction, and/or improvement of indoor air quality.

In one embodiment, operation of one or more of the HVAC components 8 may be based upon operation that occurred during the previous period. The previous period may be, for example the previous day, i.e., the previous 24 hours. Alternatively, the previous period may be, for example, the previous day less any time duration during which the process 100 operated. For example, if the process 100 operated for two hours during the previous day (for example, from 4:00 am to 6:00 am), the previous period may be 22 hours (i.e., 24 hours minus 2 hours).

At step 104, the controller 6 may execute the control scheme 100 during a predefined operating time range. The controller 6 may then deactivate the control scheme 100 after or outside of the predefined operating time range. The operating time may be between 4:00 am and 6:00 am, for example. In one embodiment, the operating time range may be user-defined. Alternatively, the operating time range may initiate at any suitable predefined time and may last for any suitable predefined duration. In one embodiment, operating time may be defined based upon occurrence of an event. In one embodiment, operating time may begin at any suitable predefined time, and not terminate until block 116 or block 120 of FIG. 3 is "no". In one embodiment, operating time may be defined based upon historical trending of the coolest part of the day. As exemplary, a photocell could be utilized to estimate a time of dawn, and then, in turn, apply that time to the next day's predetermined start and stop times of the operating range. In one embodiment, a start and stop time of the control scheme 100 may be determined based upon monitored exterior air temperature. For example, a time associated with a lowest temperature reading may be set as the start time or a predetermined time period before the monitored lowest temperature may be set as the start time and a predefined duration after the start time may be calculated for the stop time.

At step 106, the control scheme 100 determines a cooling potential of the interior air based upon the previous period, e.g., the previous day. Determining the cooling potential includes determining the cooling usage of the HVAC components 8 from the previous period, e.g., the previous day. More specifically, determining the cooling potential includes adding the sum of the products of cooling load output and run time of the HVAC components 8 from the previous period, which may be calculated using the following equation:

$$cocrt\_sum=(co_1*crt_1)+(co_2*crt_2)+ \ldots (co_n*crt_n)$$

wherein
co=cooling load output (as a factor of the total possible cooling load output);
crt=the cooling run time of the co (over the run time period of the co);
n=the total number of cooling states in the (user defined) previous period; and
cocrt_sum=the sum of the products of the cooling load outputs (over the time period) and the corresponding cooling run times (over the time period).

To illustrate using example values, if in the previous period the cooling system 14 operated in cooling mode at 50% load output for a period of 30 minutes, and at 100% load output for a period of 180 minutes, then $$cocrt\_sum=(co_1*crt_1)+(co_2*crt_2)$$

cocrt_sum=(0.5*30 minutes)+(1*180 minutes), which reduces to: cocrt_sum=(15 minutes)+(180 minutes), which is reduced to: cocrt_sum=195 minutes.

Determining the cooling potential includes determining the heating usage of the heating system 12 from the previous period, e.g., the previous day. More specifically determining the cooling potential includes adding the sum of the products of heating load output and operating time of the heating system 12 from the previous period, which may be calculated using the following equation:

$$hohrt\_sum=(ho_1*hrt_1)+(ho_2*hrt_2)+ \ldots (ho_n*hrt_n)$$

where
ho=heating load output (as a factor of the total possible heating load output);
hrt=heating run time of the ho (over the run time period of the ho, while ho is in a stable state);
n=the total number of heating states in the user defined time period being measured; and
hohrt_sum=the sum of the products of the heating load outputs (over the time period) and the corresponding heating run times (over the time period).

To illustrate using example values, if in the previous period the heating system 12 operated in heating mode at 50% load output for a period of 30 minutes, and at 100% load output for 180 minutes, then $$hohrt\_sum=(ho_1*hrt_1)+(ho_2*hrt_2);$$

hohrt_sum=(0.5*30 minutes)+(1*180 minutes);
hohrt_sum=(15 minutes)+(180 minutes); and hohrt_sum=195 minutes.

Figure 5:
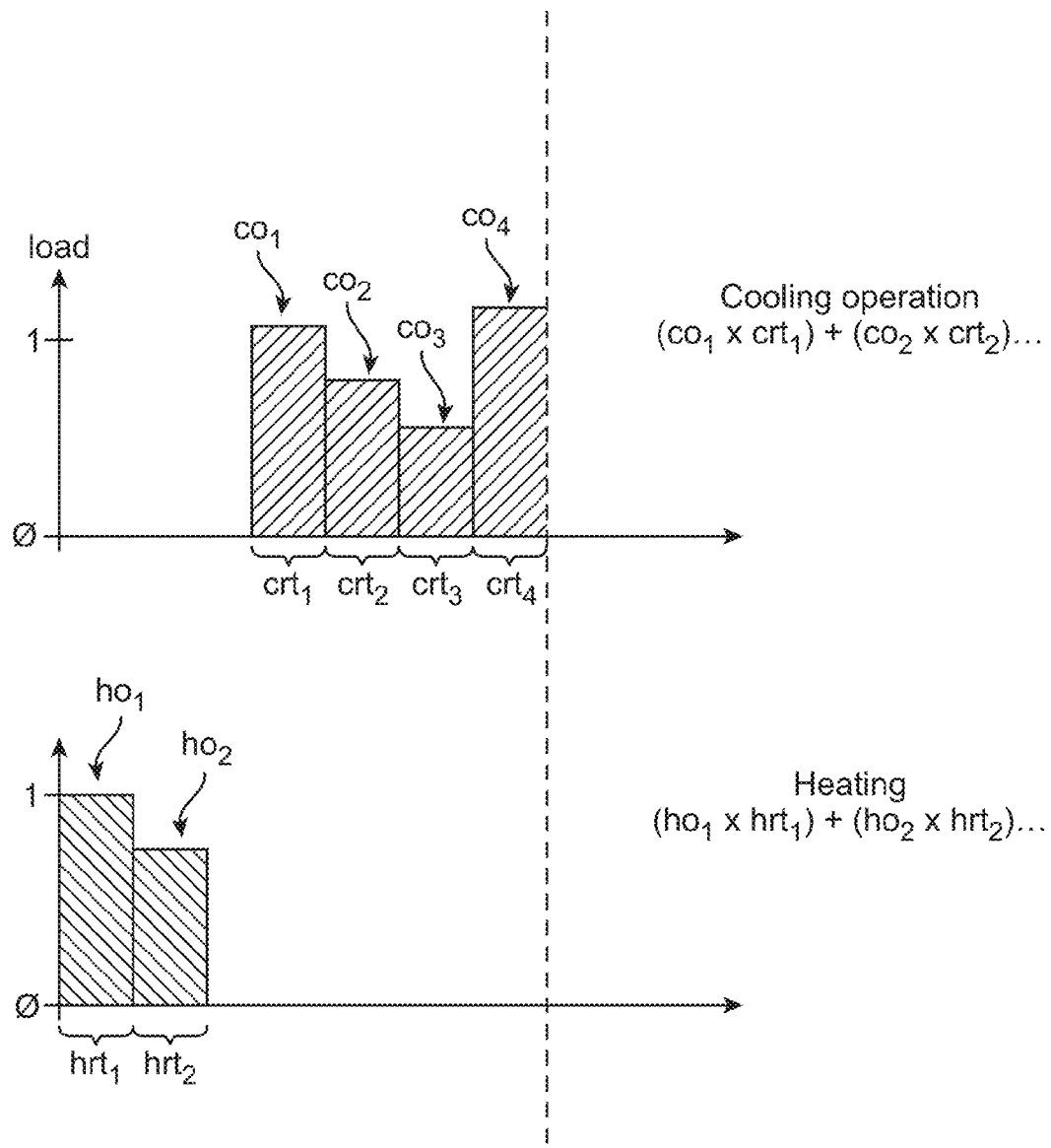
FIGS. 5 and 6 graphically illustrate exemplary occupied operational time ranges and load output for a cooling system and a heating system for calculation of a cooling potential of a building or other structure, in accordance with the present disclosure.

The cooling potential is calculated by subtracting the sum of the product of the heating load output and the run time (hohrt_sum) from the sum of the cooling load output and run time (cocrt_sum). Specifically, the controller 6 subtracts the hohrt_sum from the cocrt_sum to obtain the cooling potential (cp). For example, using the example values above:
If cp (cooling potential)=cocrt_sum−hohrt_sum; If the hohrt_sum=100 minutes; and
If the cocrt_sum=150 minutes; then cp=cocrt_sum−hohrt_sum
cp=150 minutes−100 minutes; and cp=50 minutes FIGS. 5 and 6 graphically illustrate exemplary time ranges of exemplary operation of a cooling system and a heating system. FIG. 5 graphically shows a first sum of products of operational time and operational load of the cooling system and a second sum of products calculation for operational time and operational load of the heating system. The controller may difference the second sum of products from the first sum of products. A positive result indicates cooling potential, while a zero or negative result indicates no cooling potential.

Figure 6:
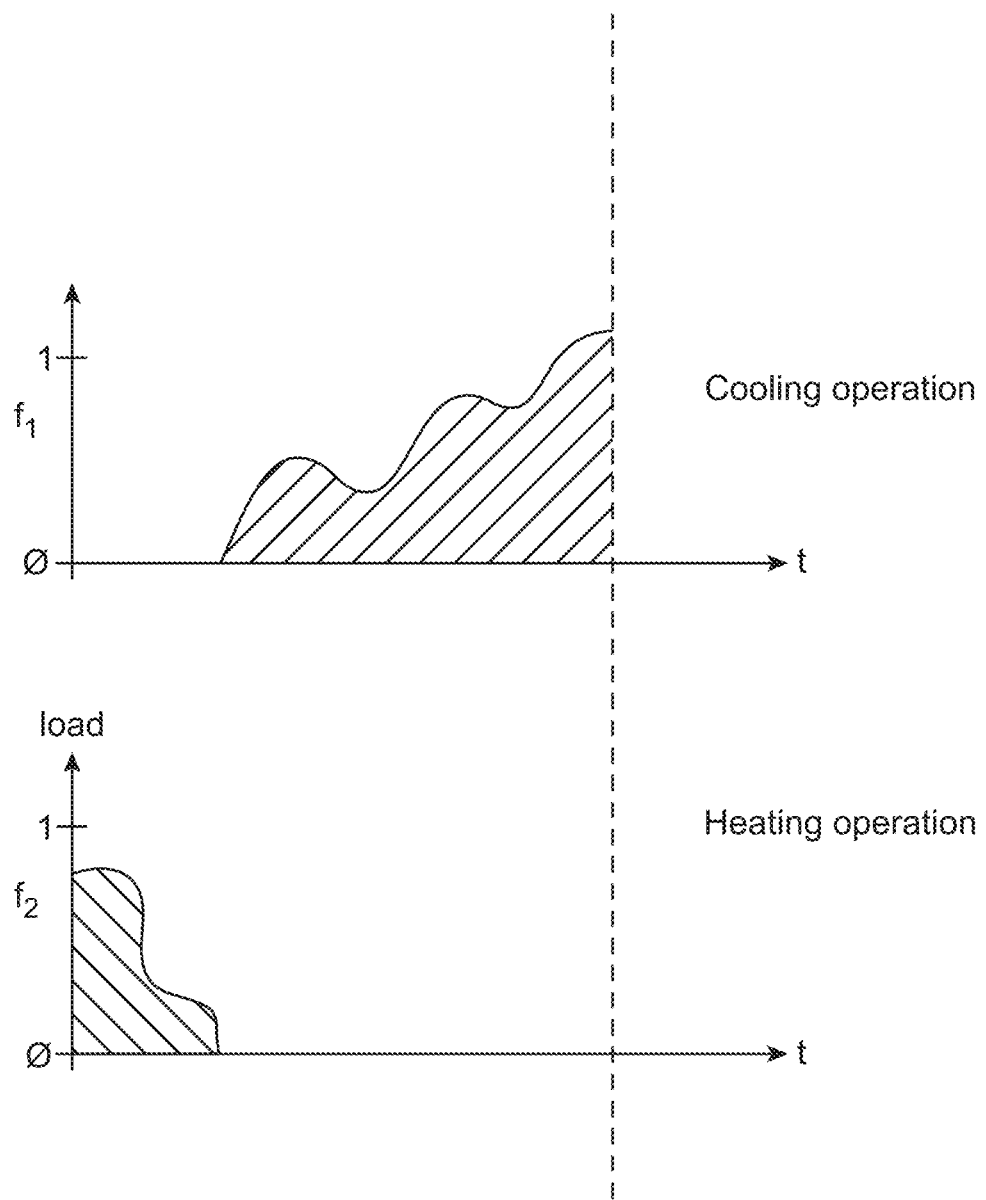

FIG. 6 shows an alternative to a sum of products calculation. For exemplary embodiments of cooling and heating equipment wherein cooling load output and heating load output are obtained as a function of operating load may be represented with respect to operating time. To determine a cooling potential the controller may execute a first integral calculation for an operational load of the cooling system as a function of operational time over the first time range, execute a second integral calculation for an operational load of the heating system as a function of operational time over the first time range and then difference the second integral from the first integral. Similar to above, a positive result indicates cooling potential, while a negative result indicates no cooling potential.

At step 108, the control scheme 100 subtracts a time bias quanta from the cooling potential (cp). The time bias may be defined or set by the user. This time bias is subtracted from the cooling potential value to inhibit use of the control scheme 100 when only slightly more cooling than heating was observed in the previous period. In such a situation, it is likely that having the equipment cool the structure in the early morning may actually cause the heating function to be energized prior to the "heat of the day," which may be around 3:00 pm. A user defined time bias may be adjusted or may be a default value, but as a default, that value may be set to 60 minutes.

For example, based upon the example values above:

$entc = cp - \text{time\_bias}$ wherein
time_bias=time bias; and
entc=enable control scheme 100 if positive value.

For example, if cp=50 minutes; and if time_bias is set to 60 minutes (which can be the default value); then entc=50 minutes−60 minutes; and entc=−10 minutes.

At step 110, the control scheme 100 determines whether the entc value is positive or negative. If the entc value is zero or negative, the control scheme 100 stops the process 100 until the next time period 130. In other words, if the entc value is zero or negative (after being biased by the user defined time bias), then conditions may, undesirably, cause the controller 6 to effectuate the heating system 12 during the upcoming period, before the heat of the day, if the control scheme 100 were to ventilate the air in the building. Accordingly, when the entc 110 value is negative, to avoid utilizing the heating system 12 after having cooled the structure, the control scheme 100 is not operated to utilize the exterior air damper 22, and/or fan 16 to intake outdoor air and/or the exhaust fan(s) 37 to exhaust interior air thereby avoiding cooling the structure undesirably and avoiding inefficient use of the heating system 12 during the upcoming time period.

At step 112, the control scheme 100 measures indoor and outdoor air conditions. At step 114, the control scheme 100 adjusts an exterior air temperature measurement using a user-defined or default temperature bias. Factoring in a temperature bias will cause the controller 6 to be less likely to determine that the exterior air is suitable to use for cooling the structure. The greater the temperature bias, the less likely the controller 6 will find the exterior air suitable. The temperature bias is added to compensate for electrical consumption of the equipment which operates during the control scheme 100 to cool the structure. For example, while running the fan(s) 16 alone consumes less electricity than running a number of the other HVAC components 8, e.g., compressors, condenser fans, etc., there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change. Enthalpy of the exterior air may be determined or estimated using exterior temperature and humidity measurements from the exterior temperature sensor 31 and the exterior humidity sensor 32 using known calculation techniques and/or modeling processes.

At step 116, subsequent to determining that the entc value is positive the control scheme 100 analyzes the exterior ambient air to determine whether the exterior air is suitable. The determination of whether the exterior air is suitable may be based upon the use of industry standard enthalpy calculations, or temperature calculations, or some combination of the two. Specifically, the interior air condition and exterior air condition is measured. The suitability may be based upon interior and exterior air temperature and, optionally, humidity values, provided by the sensors, such as interior temperature sensor 35, exterior temperature sensor 31, interior humidity sensor 36, and exterior humidity sensor 32, network values, etc., or may simply utilize interior and exterior air temperature sensors 35 and 31, respectively, network values, etc. If the controller 6 determines that the exterior air is not suitable for intake, then the control scheme is stopped at 130 and the controller 6 does not operate the damper(s) 22 and 23 and the fan 16 to intake exterior air, and optionally the exhaust fan(s) 37 to exhaust interior air.

At step 118, subsequent to determining that the exterior air is suitable for cooling (or economization), the controller 6 determines a night time cooling set point. The night time cooling set point is determined by subtracting the occupied heating set point, e.g., a "heating" set point on a conventional thermostat, from the occupied cooling set point, e.g., a "cooling" set point on a conventional thermostat, multiplying that value by a bias value (between 0 and 1, with a default of 0.67, for example), and then subtracting that product from the occupied cooling set point. The bias value may be used, for example, to affect the degree of pre-cooling within the building, with a larger biasing value resulting in more pre-cooling and a smaller biasing value resulting in less pre-cooling. For example, the following equation applies:

$ntcsp = ocsp - (ocsp - ohsp) * udbv$ wherein
ntcsp=night time cooling set point; ocsp=occupied cooling set point;
ohsp=occupied heating set point; and udbv=user defined bias value.

Example values are applied to this equation: If ocsp=70 F; If ohsp=65 F; and udbv=0.67; then ntcsp=ocsp−(ocsp−ohsp)*udbv; ntcsp=70 F−(70 F−65 F)*0.67; ntcsp=70 F−5 F*0.67; ntcsp=70 F−3.35 F; and ntcsp=66.65 F.

As explained below, with respect to FIG. 4 and control scheme 200, alternatively to utilizing only temperature values to determine the ntcsp, when humidity values are available, enthalpy values could be entered in place of temperature values to determine the ntcsp. In such a case, the value of the ntcsp could be expressed in terms of enthalpy rather than simple temperature. Likewise, alternatively to utilizing only temperature values to determine the result of step 120, when humidity values are available, indoor air enthalpy and outdoor air enthalpy could be used rather than simple temperatures.

At step 120 the control scheme 100 has determined the ntcsp, it compares the ntcsp with the interior air temperature. If the interior air temperature is less than or equal to the ntcsp, then the control scheme 100 terminates all sequences 130.

At step 122, if the interior air temperature is greater than the ntcsp, then the control scheme 100 energizes, for example, a relay, triac output, network signal, etc., which will, at least, energize equipment which causes cool outdoor air to enter the building, e.g., the fan 16, and open the exterior air damper 22 (also known as the fresh air damper 22). The control scheme 100 may energize any connected exhaust equipment such as the exhaust fan(s) 37, which may remove air from the building, to help facilitate economization of the primary heating, cooling, and ventilation equipment. The relay, triac output, network signal, etc. will remain active until conditions change in blocks 110, 116, or 120. In one embodiment, the controller will terminate step 122 if the controller 6 is transitioned to an occupied state. In one embodiment, the controller 6 will terminate step 122 if a current time is outside of the predefined time range.

At various points in the control scheme 100, the controller 6 may transition the one or more of the HVAC components 8 to a stopped operating state 130. The control scheme 100 may be configured to transition out of step 130 after a predefined duration of time or upon occurrence of an event.

Figure 4:
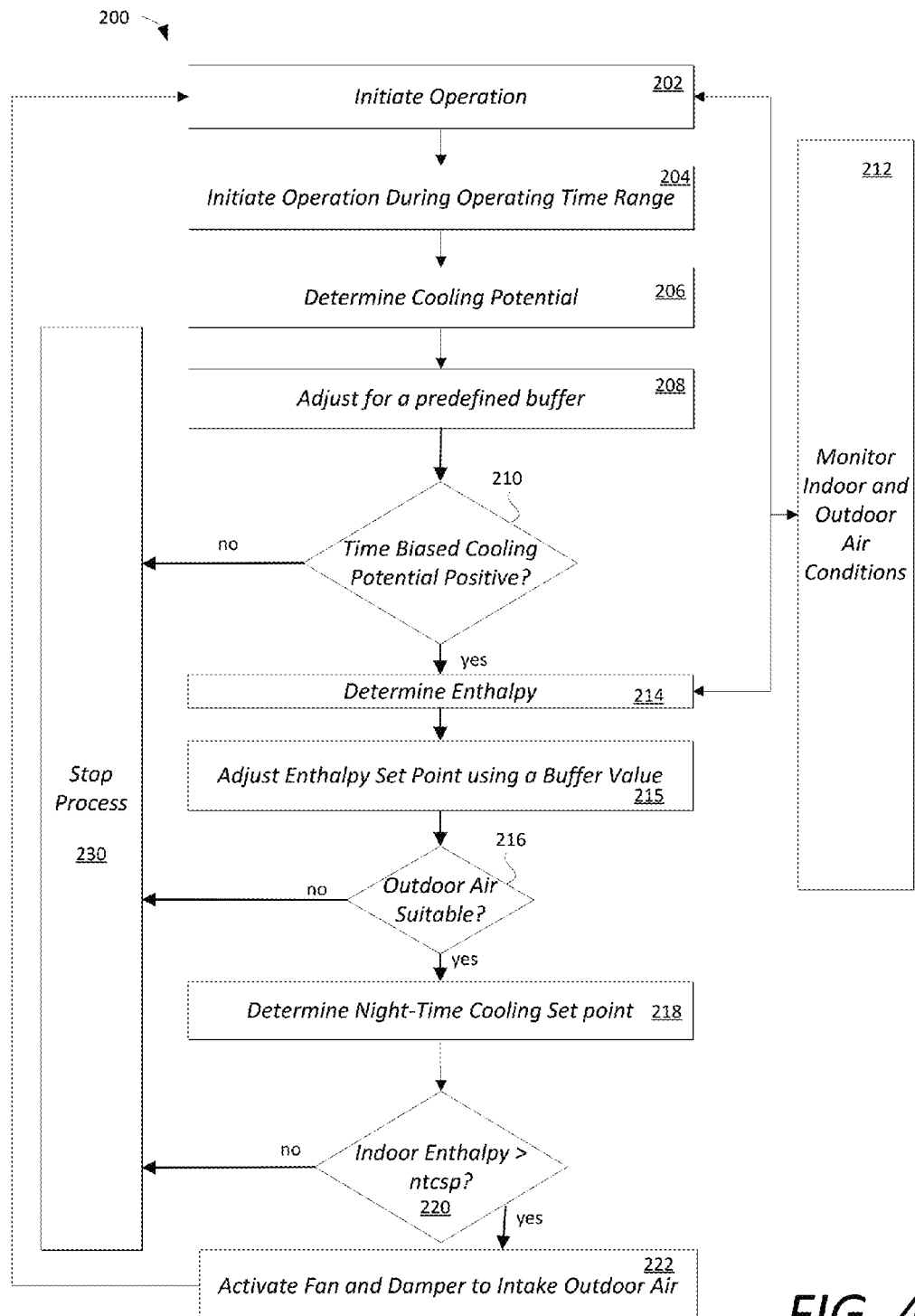
FIG. 4 is a control scheme for operating the exemplary HVAC system using enthalpy values, in accordance with the present disclosure.

FIG. 4 shows a control scheme 200 for operating the controller 6 and the HVAC components 8 illustrating operation of the system 10 using enthalpy values determined from temperature and humidity measurements. Although the control scheme 200 is shown as discrete elements, such an illustration is for ease of description and it should be recognized that the functions performed by the control scheme 200 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

The control scheme 200 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 200 is configured, in one exemplary implementation, to operate one or more of the HVAC components 8 using the controller 6 to condition the interior environment.

As FIG. 4 shows, the control scheme 200 is initiated at step 202 whereby the controller 6 operates the HVAC components 8 based upon a user's predefined operating parameters, e.g., set points, and the results of a prior iteration of the control scheme 200. In the exemplary case of venting exterior air into an interior of the structure, the control scheme 200 operates during cool mornings at predefined or determined times to proactively ventilate the building with cool exterior air based upon the operation of the HVAC components 8 during a previous period, e.g., during the previous day.

At step 204, the controller 6 may execute the control scheme 200 during a predefined operating time range, a predefined time duration having a determined start time based upon prior measured exterior air conditions and/or photocell measurements.

At step 206, the control scheme 200 determines a cooling potential of the interior air based upon the previous period, e.g., the previous day, similar to step 106 described herein above with respect to control scheme 100.

At step 208, the control scheme 200 subtracts a time bias or buffer value from the determined cooling potential (cp). This time bias is subtracted from the cooling potential value to prohibit use of the control scheme 200 when only slightly more cooling than heating was observed in the previous period.

At step 210, the control scheme 200 determines whether the entc value is positive or negative or zero. The entc value is the difference between the cooling potential value and the time bias or buffer value. If the entc value is zero or negative, the control scheme 200 stops the process 200 until the next time period by transitioning the control scheme 200 to a stop state 230.

At step 212, the control scheme 200 measures interior and exterior air conditions including an exterior temperature and exterior humidity. At step 214, the control scheme 200 determines the exterior enthalpy using the monitored exterior air conditions including temperature and humidity. Enthalpy of the exterior air may be determined or estimated using exterior temperature and humidity measurements from the exterior temperature sensor 31 and the exterior humidity sensor 32 using known calculation techniques and/or modeling processes.

At step 215, the control scheme 200 adjusts the determined enthalpy value using a buffer value. Factoring in a buffer will cause the controller 6 to be less likely to determine that the exterior air is suitable to use for cooling the structure. The greater the buffer value, the less likely the controller 6 will find the exterior air suitable. The buffer value is added to compensate for electrical consumption of the equipment which operates during the control scheme 200 to cool the structure. For example, while running the fan(s) 16 alone consumes less electricity than running a number of the other HVAC components 8, e.g., compressors, condenser fans, etc. in combination with each other, there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change.

At step 216, subsequent to determining that the entc value is positive the control scheme 200 analyzes the exterior ambient air to determine whether the exterior air is suitable. The determination of whether the exterior air is suitable may be based upon the use of industry standard enthalpy calculations, or temperature calculations, or some combination of the two. In one embodiment, the interior humidity value and exterior humidity values are compared. If the controller 6 determines that the exterior air is not suitable for intake, e.g., interior conditions are preferable to exterior conditions, then the control scheme 200 is stopped at 230 and the controller 6 does not operate the damper(s) 22 and 23 and the fan 16 to intake exterior air, and optionally the exhaust fan(s) 37 to exhaust interior air.

At step 218, subsequent to determining that the exterior air is suitable for venting exterior air to the interior of the structure, the controller 6 determines a night time enthalpy cooling set point similarly to the process described herein above with respect to control scheme 100 only using enthalpy values and not exclusively temperature values. The night time cooling set point 218 is determined by subtracting the occupied enthalpy heating set point, from the occupied enthalpy cooling set point, and then multiplying that value by a bias value (between 0 and 1, with a default of 0.67, for example), and then subtracting that product from the occupied enthalpy cooling set point. For example, the following equation applies:

$$ntcsp = ocsp - (ocsp - ohsp) * udbv$$

wherein
ntcsp=night time cooling set point; ocsp=occupied enthalpy cooling set point;
ohsp=occupied enthalpy heating set point; and udbv=user defined bias value.

At step 220 the control scheme 200 has determined the ntcsp, it compares the ntcsp with the interior enthalpy. If the interior air enthalpy is less than the ntcsp, then the control scheme 200 terminates all sequences by transitioning to block 230.

At step 222, if the interior air enthalpy is greater than the ntcsp, then the control scheme 200 energizes, for example, a relay, triac output, network signal, etc., which will, at least, energize equipment which causes cool outdoor air to enter the building, e.g., the fan 16, and open the exterior air damper 22. The process may energize any connected exhaust equipment, which may remove air from the building, to help facilitate economization of the primary heating, cooling, and ventilation equipment. The relay, triac output, network signal, etc. will remain active until conditions change in blocks 210, 216, or 220. In one embodiment, the controller will terminate step 222 if the controller 6 is transitioned to an occupied state. In one embodiment, the controller 6 will terminate step 222 if a current time is outside of the predefined time range.

At various points in the control scheme 200, the controller 6 may transition the one or more of the HVAC components 8 to a stopped operating state 230. The control scheme 200 may be configured to transition out of step 230 after a predefined duration of time or upon occurrence of an event.

FIG. 7 graphically shows operation of the HVAC system for venting exterior air into a structure with respect to indoor temperature, while outdoor air is suitable for cooling 116. As FIG. 7 shows, specific condition ranges related to the structure's interior and monitored exterior temperature result in venting exterior air to the interior of the structure. In one embodiment, venting of the exterior air to the inside will occur when: (1) the time biased cooling potential is positive; and (2) the indoor temperature is greater than a cooling set point associated with an unoccupied status of the structure, i.e., (second time range). As illustrated in FIG. 7, the criteria for venting of the exterior air to the inside is satisfied in zone 300.

As set forth above, in one embodiment the controller 6 may utilize a thermostat of the HVAC components 8. For example, when the controller 6 utilizes a conventional thermostat of the HVAC components 8, the following is typical with most conventional thermostats: G terminal=fan 16 on; Y1 terminal=cooling first stage; Y2 terminal=cooling second stage; W1 terminal=heating first stage; W2 terminal=heating second stage.

A capacitor may be set to charge when the Y1 terminal is activated, with a resistor inline with the capacitor, which acts as a regulator for the current. The same capacitor could also be charged when the Y2 terminal is activated, which would also have an inline "regulator" resistor. Likewise, the heating terminals could also have a capacitor which is charged via the W1 and W2 terminals, with "regulating" resistors in-line. The charges of the two capacitors would be discharged via a short, which is regulated by a (high value) resistor. At the initiation time of the control scheme 100, e.g., 4:00 am, the total charges of each of the two capacitors could be compared via an integrated circuit (IC) to determine the cooling potential (as set forth above) for the upcoming time period. The time bias could be incorporated by adding a potentiometer to the circuit. When used in this configuration, some level of circuit integration could be added. For example, a time clock of the thermostat may be incorporated into the process. Similarly, the occupied set points (or at least the lowest cooling set point) may be incorporated into the process.

In one embodiment, interior humidity and exterior humidity sensors are optional, and a provision may be made to utilize both or only one type of humidity sensor. In one exemplary application using only an exterior humidity sensor, the system 10 utilizes a default, predefined humidity reading as a reference marker to compare measurements from the exterior humidity sensor. For example, the system 10 may be configured to assume that the interior humidity is at a first predefined level under a first set of criteria, e.g., a reading from the exterior humidity sensor after running the control scheme 100 for at least a first time period. Another example, may assume that the interior humidity is simply at a predefined level. During operation, the system 10 could compare the assumed humidity value and the measured value until the exterior humidity levels exceed 50% relative humidity, at which point the assumed interior humidity level would stay at 50%, while the actual relative humidity value for the exterior humidity levels would be reflected in the system's 10 calculations. In one embodiment, the control scheme 100 may stop if the exterior humidity is above and/or below a predetermined threshold.

On thermostat embodiments having a switch to select "cool" (only) or "heat" (only), there could be a calculated or user-defined ntcsp (see above). The calculated ntcsp could use a user defined temperature offset value which may be set via programming the thermostat, or may simply use a default value of a certain number of degrees less than the lowest cooling set point on the thermostat.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a ventilation system and a cooling system to vent outside air within a structure, the method comprising:
   monitoring an interior temperature of the structure;
   monitoring an exterior temperature of ambient air outside of the structure;
   defining a first time range and a second time range, wherein the second time range comprises a duration less than the first time range;
   associating one or more operating parameters of the ventilation system and the cooling system with the first time range;
   associating one or more operating parameters of the ventilation system and the cooling system with the second time range;
   monitoring operational time and operational load of the cooling system for the first time range;
   controlling the ventilation system during the second time range based upon the monitored operational time and operational load of the cooling system for the first time range, the monitored interior and exterior temperatures, and the one or more operating parameters of the cooling system associated with the second time range; and
   executing a first sum of products calculation for operational time and operational load of the cooling system associated with the first time range;
   executing a second sum of products calculation for operational time and operational load of a heating system associated with the first time range;
   differencing the second sum of products from the first sum of products; and
   controlling the ventilation system to an ON operating state during the second time range when the differencing result is a positive value.

2. The method of claim 1, wherein the executing the first sum of products is executed using a first integral calculation and wherein executing the second sum of products is executed using a second integral calculation.

3. The method of claim 1, wherein the controlling is further executed based upon at least one biasing value; and
   wherein at least one of a start time and an end time of the second time range is determined based upon photo sensor measurements from a prior time period, and wherein the second time range comprises a predefined duration.

4. The method of claim 1, wherein the one or more operating parameters of the cooling system with the first time range includes a heating set point; and
   further controlling the ventilation system during the second time range to cool the structure to a temperature associated with the heating set point associated with the first time range.

5. The method of claim 1, wherein the one or more operating parameters of the ventilation system and the cooling system with the first time range includes a heating set point; and
   further controlling the ventilation system during the second time range to cool the structure to a temperature of the heating set point associated with the first time range plus a predefined buffer temperature.

6. The method of claim 1, wherein the one or more operating parameters of the ventilation system and the cooling system associated with the first time range includes a heating set point and a cooling set point; and
   further controlling the ventilation system during the second time range to cool the structure to a temperature of ocsp−(ocsp−ohsp)*udbv
   wherein
   ocsp=occupied cooling set point;
   ohsp=occupied heating set point;
   ohsp≤ocsp; and
   udbv=a predefined biasing value between 0 and 1.

7. The method of claim 1, further comprising:
   comparing the monitored interior temperature to the monitored exterior temperature; and
   further controlling the ventilation system based upon the comparing.

8. The method of claim 7, wherein the further controlling the ventilation system based upon the comparing further comprises: controlling the ventilation system during the second time range to cool the structure when the monitored exterior temperature is lower than the monitored interior temperature.

9. The method of claim 1, wherein the ventilation system comprises a fan.

10. The method of claim 9, wherein the ventilation system further comprises a second fan configured to exhaust air externally of the structure.

11. The method of claim 1, wherein the ventilation system comprises at least one damper.

12. The method of claim 1, further comprising:
    further controlling the ventilation system to an ON operating state during the second time range when the monitored operational time and operational load of the cooling system for the first time range is greater than a null value, the monitored interior temperature is greater than the monitored exterior temperature, and the monitored interior temperature is greater than a cooling set point associated with the second time range.

13. A method for operating a heating, ventilation, and cooling (HVAC) system having a cooling system and a ventilation system to vent outside air within a structure, the method comprising:
    monitoring an interior temperature of the structure;
    monitoring an exterior temperature and exterior humidity of ambient air outside of the structure;
    associating one or more operating parameters of the HVAC system with a first time range;
    associating one or more operating parameters of the HVAC system with a second time range, wherein the second time range comprises a duration less than the first time range, and the first and second time range combined comprise one day;
    monitoring operational time and operational load of the cooling system for the first time range;
    controlling the ventilation system during the second time range based upon the monitored operational time and operational load of the cooling system in the first time range, the monitored interior and exterior temperatures, the monitored exterior humidity and the one or more operating parameters of the cooling system associated with the second time range;
    executing a first sum of products calculation for operational time and operational load of the cooling system for the first time range;

executing a second sum of products calculation for operational time and operational load of a heating system for the first time range;
differencing the second sum of products from the first sum of products; and
controlling the ventilation system for the second time range when the differencing result is a positive value.

14. The method of claim 13, wherein the executing the first sum of products is executed using a first integral calculation and wherein executing the second sum of products is executed using a second integral calculation.

15. The method of claim 13, wherein the controlling is further executed based upon at least one biasing value;
wherein the one or more operating parameters of the cooling system with the first time range includes a heating set point; and
further controlling the ventilation system during the second time range to cool the structure to a temperature associated with the heating set point associated with the first time range plus a predefined buffer temperature.

16. The method of claim 13, wherein the one or more operating parameters of the HVAC system associated with the first time range includes a heating set point and a cooling set point; and
further controlling the ventilation system during the second time range to cool the structure to a temperature of
ocsp−(ocsp−ohsp)*udbv
wherein
ocsp=occupied cooling set point;
ohsp=occupied heating set point;
ohsp≤ocsp; and
udbv=a predefined biasing value between 0 and 1.

17. The method of claim 13, further comprising:
comparing the monitored interior temperature to the monitored exterior temperature; and
further controlling the ventilation system based upon the comparing, wherein the further controlling the ventilation system based upon the comparing further comprises: controlling the ventilation system during the second time range to cool the structure when the monitored exterior temperature is lower than the monitored interior temperature.

18. The method of claim 13, further comprising:
further controlling the ventilation system to an ON operating state during the second time range when the monitored operational time and operational load of the cooling system for the first time range is greater than a null value, the monitored interior temperature is greater than the monitored exterior temperature, and the monitored interior temperature is greater than a cooling set point associated with the second time range.

19. A method for operating a ventilation system and a cooling system to vent outside air within a structure, the method comprising:
monitoring an interior temperature of the structure;
monitoring an exterior temperature of ambient air outside of the structure;
defining a first time range and a second time range, wherein the second time range comprises a duration less than the first time range, and wherein the second time range comprises a cooling set point greater than a heating set point associated with the first time range;
associating one or more operating parameters of the ventilation system and the cooling system with the first time range;
associating one or more operating parameters of the ventilation system and the cooling system with the second time range;
monitoring operational time and operational load of the cooling system for the first time range; and
controlling the ventilation system to an ON operating state during the second time range when the monitored operational time and operational load of the cooling system for the first time range is greater than a null value, the monitored interior temperature is greater than the monitored exterior temperature, and the monitored interior temperature is greater than the cooling set point associated with the second time range;
executing a first sum of products calculation for operational time and operational load of the cooling system for the first time range;
executing a second sum of products calculation for operational time and operational load of a heating system for the first time range;
differencing the second sum of products from the first sum of products; and
further controlling the ventilation system to an ON operating state during the second time range when the differencing result is a positive value.

20. The method of claim 19, wherein controlling the ventilation system to an ON operating state comprises opening an intake damper.

21. The method of claim 19, wherein controlling the ventilation system to an ON operating state comprises exhausting return air to an exterior of the structure.

22. The method of claim 19, wherein controlling the ventilation system to an ON operating state comprises actuating a fan to an ON operating state to intake exterior air into the structure.

23. The method of claim 19, wherein the executing the first sum of products is executed using a first integral calculation and wherein executing the second sum of products is executed using a second integral calculation.

24. The method of claim 19, wherein the controlling is further executed based upon at least one biasing value; and
further controlling the ventilation system during the second time range to cool the structure to the heating set point associated with the first time range plus a predefined buffer temperature.

25. The method of claim 19, further comprising:
further controlling the ventilation system during the second time range to cool the structure to a temperature of
ocsp−(ocsp−ohsp)*udbv
wherein
ocsp=cooling set point associated with the second time range;
ohsp=heating set point associated with the first time range;
ohsp≤ocsp; and
udbv=a predefined biasing value between 0 and 1.

* * * * *